United States Patent
Sakata et al.

(10) Patent No.: US 9,776,517 B2
(45) Date of Patent: Oct. 3, 2017

(54) POWER SUPPLY DEVICE FOR VEHICLE PERFORMING REGENERATIVE BRAKING

(71) Applicant: SANYO Electric Co., Ltd., Osaka (JP)

(72) Inventors: Hideki Sakata, Hyogo (JP); Nobuyuki Ohsumi, Hyogo (JP); Kaoru Nakajima, Hyogo (JP); Akinobu Tsunesada, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 266 days.

(21) Appl. No.: 14/435,590

(22) PCT Filed: Oct. 24, 2013

(86) PCT No.: PCT/JP2013/006297
§ 371 (c)(1),
(2) Date: Apr. 14, 2015

(87) PCT Pub. No.: WO2014/068919
PCT Pub. Date: May 8, 2014

(65) Prior Publication Data
US 2015/0298557 A1    Oct. 22, 2015

(30) Foreign Application Priority Data
Oct. 29, 2012   (JP) ................ 2012-238123

(51) Int. Cl.
*B60L 11/18*    (2006.01)
*H01M 10/613*    (2014.01)
(Continued)

(52) U.S. Cl.
CPC ............ *B60L 11/18* (2013.01); *B60L 1/003* (2013.01); *B60L 1/02* (2013.01); *B60L 3/0046* (2013.01);
(Continued)

(58) Field of Classification Search
CPC ...... B60L 11/18; B60L 3/0046; H01M 10/613
(Continued)

(56) References Cited

U.S. PATENT DOCUMENTS 6,366,055 B1    4/2002   Ookoshi et al.
9,548,477 B2 *  1/2017   Asaida ............... H01M 2/1077
(Continued)

FOREIGN PATENT DOCUMENTS

JP    4-340328      11/1992
JP    6-073860 U   10/1994
(Continued)

OTHER PUBLICATIONS

International Search Report of PCT application No. PCT/JP2013/006297 dated Jan. 7, 2014.

*Primary Examiner* — Brandon S Cole
(74) *Attorney, Agent, or Firm* — Wenderoth, Lind & Ponack, L.L.P.

(57) ABSTRACT

A power supply device comprises a lead-acid battery disposing a plurality of cells in a battery case of a rectangular parallelepiped shape having a pair of facing walls and a pair of end surface walls at the circumference of a rectangular bottom surface plate, and a power storage device connected in parallel to the lead-acid battery. The power storage device has a larger storage capacity by regenerative braking than that of the lead-acid battery, and the power storage device has an external case having a heat radiation plate disposed in a thermally connected state to the facing wall of the lead-acid battery, and the heat radiation plate is thermally connected to the facing wall of the lead-acid battery.

7 Claims, 4 Drawing Sheets (51) Int. Cl.
*H01M 10/625* (2014.01)
*H01M 10/6551* (2014.01)
*B60L 1/02* (2006.01)
*H02M 3/158* (2006.01)
*H02J 1/00* (2006.01)
*B60R 16/033* (2006.01)
*H01G 2/08* (2006.01)
*H01M 2/10* (2006.01)
*H01M 2/20* (2006.01)
*H01G 11/08* (2013.01)
*H01G 11/18* (2013.01)
*B60L 1/00* (2006.01)
*B60L 3/00* (2006.01)
*B60L 7/14* (2006.01)
*B60L 11/00* (2006.01)
*B60L 15/20* (2006.01)
*H01M 10/052* (2010.01)
*H01M 10/34* (2006.01)

(52) U.S. Cl.
CPC .............. *B60L 7/14* (2013.01); *B60L 11/005* (2013.01); *B60L 11/1803* (2013.01); *B60L 11/1853* (2013.01); *B60L 11/1861* (2013.01); *B60L 11/1864* (2013.01); *B60L 11/1868* (2013.01); *B60L 11/1874* (2013.01); *B60L 11/1875* (2013.01); *B60L 11/1879* (2013.01); *B60L 15/2009* (2013.01); *B60R 16/033* (2013.01); *H01G 2/08* (2013.01); *H01G 11/08* (2013.01); *H01G 11/18* (2013.01); *H01M 2/1077* (2013.01); *H01M 2/206* (2013.01); *H01M 10/613* (2015.04); *H01M 10/625* (2015.04); *H01M 10/6551* (2015.04); *B60L 2240/545* (2013.01); *B60L 2240/547* (2013.01); *B60L 2240/549* (2013.01); *H01M 10/052* (2013.01); *H01M 10/345* (2013.01); *H01M 2220/20* (2013.01); *Y02E 60/122* (2013.01); *Y02E 60/124* (2013.01); *Y02E 60/13* (2013.01); *Y02T 10/645* (2013.01); *Y02T 10/7016* (2013.01); *Y02T 10/7022* (2013.01); *Y02T 10/7044* (2013.01); *Y02T 10/7061* (2013.01); *Y02T 10/7066* (2013.01); *Y02T 10/72* (2013.01); *Y02T 10/7275* (2013.01)

(58) Field of Classification Search
USPC ........................................................ 307/1–87
See application file for complete search history.

(56) References Cited

U.S. PATENT DOCUMENTS

| | | |
|---|---|---|
| 2003/0160510 A1 | 8/2003 | Mizutani et al. |
| 2009/0061305 A1 | 3/2009 | Nishida et al. |
| 2010/0170735 A1* | 7/2010 | Nakamura ............... B60K 1/04 180/68.5 |
| 2011/0001352 A1* | 1/2011 | Tamura ................. B60R 16/033 307/9.1 |
| 2012/0169288 A1* | 7/2012 | Ueki .................... B60L 11/1861 320/134 |
| 2012/0319471 A1* | 12/2012 | Miller .................... B60L 3/0046 307/9.1 |
| 2014/0220391 A1* | 8/2014 | Fujii ................. H01M 10/4257 429/7 |
| 2015/0035370 A1* | 2/2015 | Wyatt ................. H01M 10/625 307/77 |
| 2015/0275841 A1* | 10/2015 | Sakata .................. B60R 16/033 123/179.28 |
| 2016/0111702 A1* | 4/2016 | Ohsumi ............... H01M 2/1083 429/179 |

FOREIGN PATENT DOCUMENTS

| | | |
|---|---|---|
| JP | 2002-042764 | 2/2002 |
| JP | 2003-254208 | 9/2003 |
| JP | 2009-059474 | 3/2009 |
| JP | 2010-113888 | 5/2010 |
| JP | 2011-054366 | 3/2011 |
| JP | 2011-208599 | 10/2011 |
| JP | 3176029 U | 6/2012 |
| JP | 2013-164930 | 8/2013 |

* cited by examiner

POWER SUPPLY DEVICE FOR VEHICLE PERFORMING REGENERATIVE BRAKING

TECHNICAL FIELD

The present invention is related to a power supply device for a vehicle performing regenerative braking at deceleration of the vehicle for improving a fuel efficiency, especially a power supply device for a vehicle where charging efficiency of regenerative generation power can be improved and an excellent fuel efficiency can be realized by connecting a lead-acid battery and a power storage device such as a secondary battery or a capacitor in parallel.

BACKGROUND ART

A vehicle where a battery is charged by regenerative braking, stores kinetic energy of a driving vehicle in a lead-acid battery. In the vehicle performing regenerative power generation, the lead-acid battery is charged through driving an alternator by kinetic energy of the vehicle at deceleration. As an internal resistance of the lead-acid battery at charging, namely a charging resistance is large, there is a demerit that the lead-acid battery cannot be efficiently charged with regenerative generation power. As a charging current of the lead-acid battery at regenerative braking is remarkably large, for example, 100 A or more, the lead-acid battery is frequently charged with a large current by regenerative generation each time the vehicle is braked, and then there is a demerit that a life of the lead-acid battery is remarkably shortened.

In order to resolve this demerit, the power supply device where the lead-acid battery is connected in parallel to the sub-battery, is developed. (refer to patent literatures 1 and 2)

CITATION LIST

Patent Literature

Patent Literature 1: Japanese Laid-Open Patent Publication No. 2011-208599
Patent Literature 2: Japanese Laid-Open Patent Publication No. 2003-254208

SUMMARY OF THE INVENTION

In the power supply device described in these patent literatures, a lithium ion secondary battery is connected in parallel to the lead-acid battery. The power supply device where the lithium ion secondary battery is connected in parallel to the lead-acid battery, is efficiently charged with regenerative generation power. In addition, as the power supply device divides a large current from the lead-acid battery to the lithium ion secondary battery and charges at regenerative braking, it makes charging current of the lead-acid battery decreased, and degradation of the lead-acid battery can be reduced.

The power supply device where the sub-battery such as the lithium ion secondary battery is connected in parallel to the lead-acid battery, makes charging resistance as internal resistance at the time of charging the sub-battery smaller than that of the lead-acid battery, and can make charge current of the sub-battery at regenerative braking large. Making charging current of the sub-battery large is to make charging current of the lead-acid battery small at regenerative braking, and then the degradation of the lead-acid battery can be suppressed. However, in this power supply device, each time the vehicle is stopped by regenerative braking due to waiting for a traffic light, as the lead-acid battery and the sub-battery are charged with large current, the battery temperature is increased by heat generation in the lead-acid battery and the sub-battery due to Joule heat. Especially, in order to make charging current smaller at regenerative braking, charging resistance of the sub-battery is made small, and charging current of the sub-battery is made large. In such a power supply device, the temperature of the sub-battery through which a large charging current flows is more increased. When the temperature of the sub-battery is increased, charging resistance of the sub-battery becomes small, and then charging current at regenerative braking becomes larger, and heat generation in the sub-battery due to Joule heat is more increased. The temperature increase of the sub-battery has an effect that charging current of the lead-acid battery is decreased and its degradation can be reduced. However, as when the temperature of the sub-battery is abnormally increased, there is a demerit that the sub-battery cannot be safely used. Further, since the sub-battery such as the nickel hydride battery, the lithium ion secondary battery, and the electric double layer capacitor is more expensive than the lead-acid battery, it is important that not only the short life of the lead-acid battery, but also the abnormal degradation of the sub-battery is prevented.

The present disclosure is developed for the purpose of preventing the abnormal temperature increase of the power storage device configuring the sub-battery. One non-limiting and explanatory embodiment provides a power supply device for a vehicle performing regenerative braking in which while the degradation of the lead-acid battery is reduced and its life is prolonged without complicated cooling mechanism such as forcible cooling, the abnormal temperature increase of the power storage device is also prevented.

A power supply device for a vehicle performing regenerative braking of the present disclosure comprises a lead-acid battery disposing a plurality of cells in a battery case of a rectangular parallelepiped shape having a pair of facing walls and a pair of end surface walls at the circumference of a rectangular bottom surface plate, and a power storage device connected in parallel to the lead-acid battery. The power storage device has a larger storage capacity by regenerative braking than that of the lead-acid battery, and the power storage device has an external case having a heat radiation plate disposed in a thermally connected state to the facing wall of the lead-acid battery, and the heat radiation plate is thermally connected to the facing wall of the lead-acid battery.

The power supply device of the present disclosure is installed in the vehicle performing regenerative braking, and the degradation of the lead-acid battery is reduced and its life is prolonged without complicated cooling mechanism such as forcible cooling, the abnormal temperature increase of the power storage device is also prevented. Especially, as the power storage device has a larger storage capacity by regenerative braking than that of the lead-acid battery, the storage capacity of the power storage device is large, and the storage capacity of the lead-acid battery is small. Therefore, charging current of the lead-acid battery at the regenerative braking is made small by the power storage device, and then the degradation of the lead-acid battery by large charging current can be suppressed. In the power storage device having the larger storage capacity than that of the lead-acid battery, charging current at the regenerative braking becomes large, and the heat generation amount becomes large. However, the power supply device has a distinct heat radiation structure, and the power storage device having the large heat generation amount is efficiently radiated, and then the abnormal temperature increase can be prevented. It is a reason why the radiation plate of the power storage device is disposed in a thermally connected state to the facing wall of the lead-acid battery, and the radiation plate is disposed in a thermally connected state to the plurality of the cells of the lead-acid battery, and heat generation of the power storage device is radiated from the radiation plate to the plurality of the cells. Especially, as heat generation of the power storage device is radiated to the plurality of the cells of the lead-acid battery in well balance, and then heat of the power storage device is effectively radiated. It is a reason why heat generation of the power storage device is radiated in well balance to the electrolyte and the electrode plate which are stored in each of the cells of the lead-acid battery. Assuming that the radiation plate of the power storage device is disposed in a thermally connected state to the end surface wall of the lead-acid battery, heat generation of the power storage device is radiated to only one cell, and then heat cannot be efficiently radiated.

In the power supply device for a vehicle performing regenerative braking of the present disclosure, in the power storage device, a plurality of secondary batteries are disposed in a horizontal posture and in vertically multiply stacked state in the external case, and each of the secondary batteries is connected by a bus bar of a metal plate. Further the power storage device has an output terminal connected to an electrode of the secondary battery on the upper surface of the external case, and the output terminal is connected in parallel to an electrode terminal provided on the upper surface of the lead-acid battery through a connecting plate of a metal board.

In the power supply device, heat of the secondary batteries installed in the power storage device is radiated in well balance. It is a reason why heat of the secondary batteries becoming the high temperature in the upper stages is efficiently radiated. The heat of the secondary batteries becoming the high temperature in the upper stages transmits through the output terminal and the connecting plate to the electrode terminal of the lead-acid battery, and the heat is effectively radiated at the lead-acid battery.

In the power supply device for a vehicle performing regenerative braking of the present disclosure, the secondary batteries are nickel hydride batteries. As the nickel hydride battery has the same nominal voltage as one cell of the lead-acid battery, the number of the series-connected nickel hydride batteries is adjusted, and then the nominal voltage of the power storage device is made the same as the nominal voltage of the lead-acid battery. Therefore, the power storage device can be directly connected in parallel to the lead-acid battery without a circuit for adjusting voltage such as a DC/DC converter. Thus, the lead-acid battery and the power storage device are connected in parallel by a simple circuit configuration, and are charged and discharged in well balance.

In the power supply device for a vehicle performing regenerative braking of the present disclosure, the secondary batteries are lithium ion secondary batteries or lithium polymer batteries. The power supply device can increase the output with respect to capacity and weight.

In the power supply device for a vehicle performing regenerative braking of the present disclosure, the power storage device is a condenser. In the power supply device, the power storage device is charged with remarkably large current at the initial time of starting the regenerative braking, and the degradation of the lead-acid battery by large current is reduced.

In the power supply device for a vehicle performing regenerative braking of the present disclosure, the lead-acid battery is connected in parallel to the power storage device through the connecting plate, and the connecting plate has a heat radiation fin. In the power supply device, heat generation of the power storage device is efficiently radiated by the connecting plate.

In the power supply device for a vehicle performing regenerative braking of the present disclosure, the connecting plate has a larger area facing to the battery case of the lead-acid battery than an area facing to the external case of the power storage device. In the power supply device, heat generation of the power storage device is more efficiently radiated by the connecting plate. As the connecting plate has the large area facing to the lead-acid battery at the lower temperature, heat radiation amount at this area can be made large. The area of the connecting plate facing to the lead-acid battery at the lower temperature is not heated by convection or radiant heat with the lead-acid battery, and heat energy transmitted from the power storage device is efficiently radiated.

DESCRIPTION OF EMBODIMENTS

Hereinafter, the embodiment of the present invention will be described referring to drawings. However, the following embodiments illustrate a power supply device for a vehicle performing regenerative braking which is aimed at embodying the technological concept of the present invention, and the present invention is not limited to the power supply device for a vehicle performing regenerative braking described below. Further, the members illustrated in Claims are not limited to the members in the embodiments.

Figure 1:
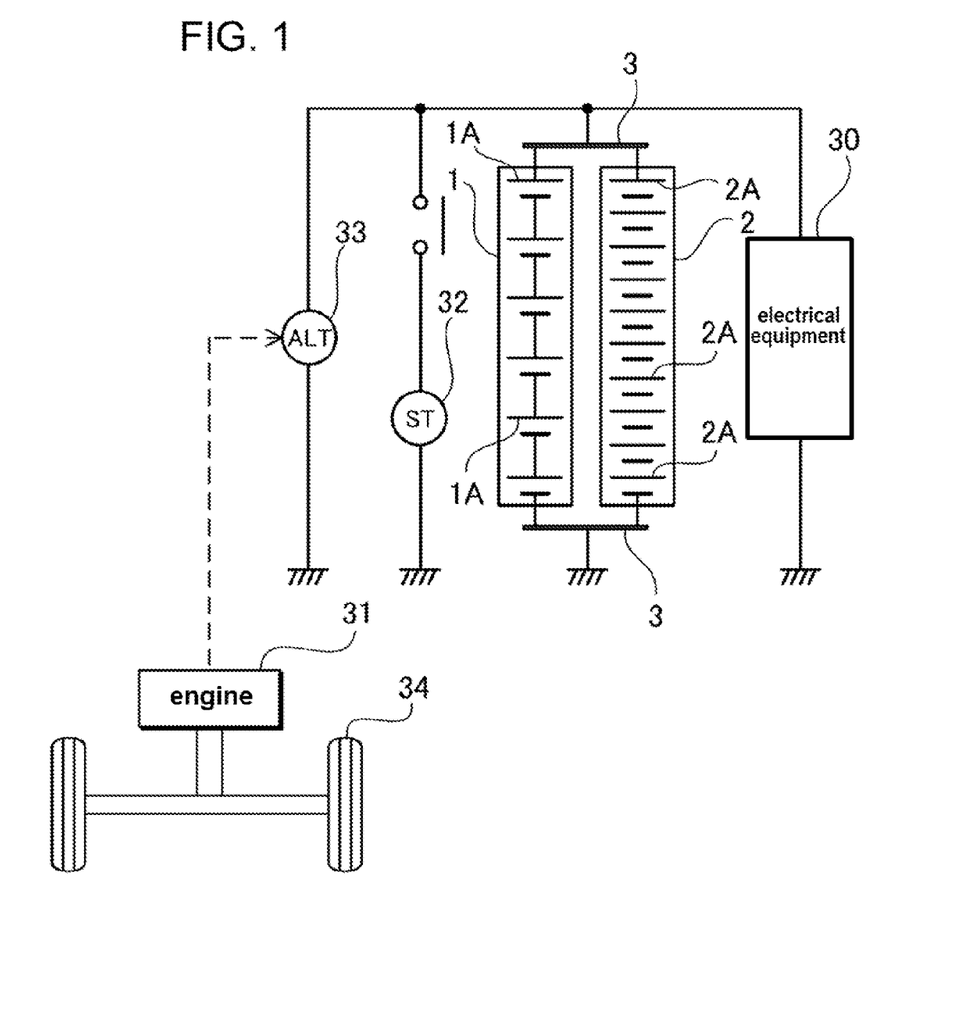
FIG. 1 is a block diagram showing a state where a vehicle performing regenerative braking incorporates a power supply device related to one embodiment of the present invention.

The power supply device shown in a block diagram of FIG. 1, is installed in the vehicle performing regenerative braking. Preferably, it is installed in the vehicle having a regenerative braking function and an idle stop (idle reduction) function. This power source device includes a lead-acid battery 1 and a power storage device 2. The lead-acid battery 1 and the power storage device 2 are connected in parallel, and are charged with regenerative generation power. The regenerative generation power is stored in both of the lead-acid battery 1 and the power storage device 2. In the power supply device installed in the vehicle having the idle stop function, power is supplied from both of the lead-acid battery 1 and the power storage device 2 to a starter motor 32, or from only the lead-acid battery 1 to the starter motor 32.

The vehicle having the idle stop function rotates the alternator 33 by kinetic energy at deceleration. In the regenerative braking state, a wheel 34 rotates the engine 31, and the engine 31 rotates the alternator 33. A rotating torque of the alternator 33 brakes and decelerates the vehicle through the engine 31. Power generated from the alternator 33 by regenerative braking becomes large in direct proportion to kinetic energy of the vehicle. The kinetic energy of the vehicle becomes large in direct proportion to the product of the weight of the vehicle multiplied by the square of the speed. For example, a vehicle of the speed 60 km/h and 1 ton has the kinetic energy of approximate 40 Wh. Assuming that the battery is charged with an efficiency 50% of the kinetic energy, a standard size car of the speed 60 km/h can charge the battery with power of 20 Wh each time the vehicle is stopped due to waiting for a traffic light. Therefore, assuming that the vehicle driving at the speed 60 km/h stops by 20 seconds and the battery of 12 V is charged with a constant current, an output current of the alternator 33 at regenerative braking is 300 A, and it is very large.

As mentioned above, in the regenerative braking, during a short time until stopping of the vehicle, the output current of the alternator 33 becomes very large, it is important that the output of the alternator 33 generated by the regenerative braking is efficiently stored. In the power supply device of FIG. 1, the lead-acid battery 1 is connected in parallel to the power storage device 2.

The power storage device 2 comprises secondary batteries 2a or condensers. The power storage device 2 has a storage capacity of the regenerative braking larger than that of the lead-acid battery 1. The power storage device 2 of the secondary batteries 2A has a charging resistance smaller than that of the lead-acid battery 1 in order to get a larger storage capacity than that of the lead-acid battery 1. The secondary batteries 2A are nickel hydride batteries. As the nickel hydride battery has a nominal voltage 1.2 V, 10 series connection of the nickel hydride batteries has a nominal voltage 12 V of the power storage device 2. As the power storage device 2 of the nickel hydride batteries has the same nominal voltage as the lead-acid battery 1, the power storage device 2 can be connected in parallel to the lead-acid battery 1 without a circuit for adjusting voltage such as a DC/DC converter. Here, as the secondary batteries of the power storage device, the non-aqueous electrolyte secondary batteries such as lithium ion secondary batteries or lithium polymer batteries which has charging resistance smaller than that of the lead-acid battery, can be used. The nickel hydride batteries have very small charging resistance and excellent charging characteristics by large current. The non-aqueous electrolyte secondary batteries such as lithium ion secondary batteries have light weight and those can makes charging and discharging capacity large.

The power storage device 2 of the secondary batteries 2A having charging resistance smaller than that of the lead-acid battery, is connected in parallel to the lead-acid battery 1, and charging current at the regenerative braking is made larger than that of the lead-acid battery 1, and then the storage capacity larger than the lead-acid battery 1 is made. In this power supply device, charging current of the power storage device 2 at the regenerative braking is made large, and charging current of the lead-acid battery 1 is made small, and then the degradation of the lead-acid battery 1 by large charging current can be suppressed.

The condensers as the power storage device 2 are electric double layer capacitors having large electrostatic capacity. The power storage device 2 of the condensers has very small charging resistance, and storage capacity at the regenerative braking can be larger than that of the lead-acid battery 1. Further, as its discharging resistance is also small, it is connected in parallel to the lead-acid battery 1, and then power can be supplied to the starter motor 32. Here, as the voltage of the condenser is changed according to stored capacity, namely stored electrical charge, it is connected to the lead-acid battery 1 through a bidirectional DC/DC converter.

Figure 2:
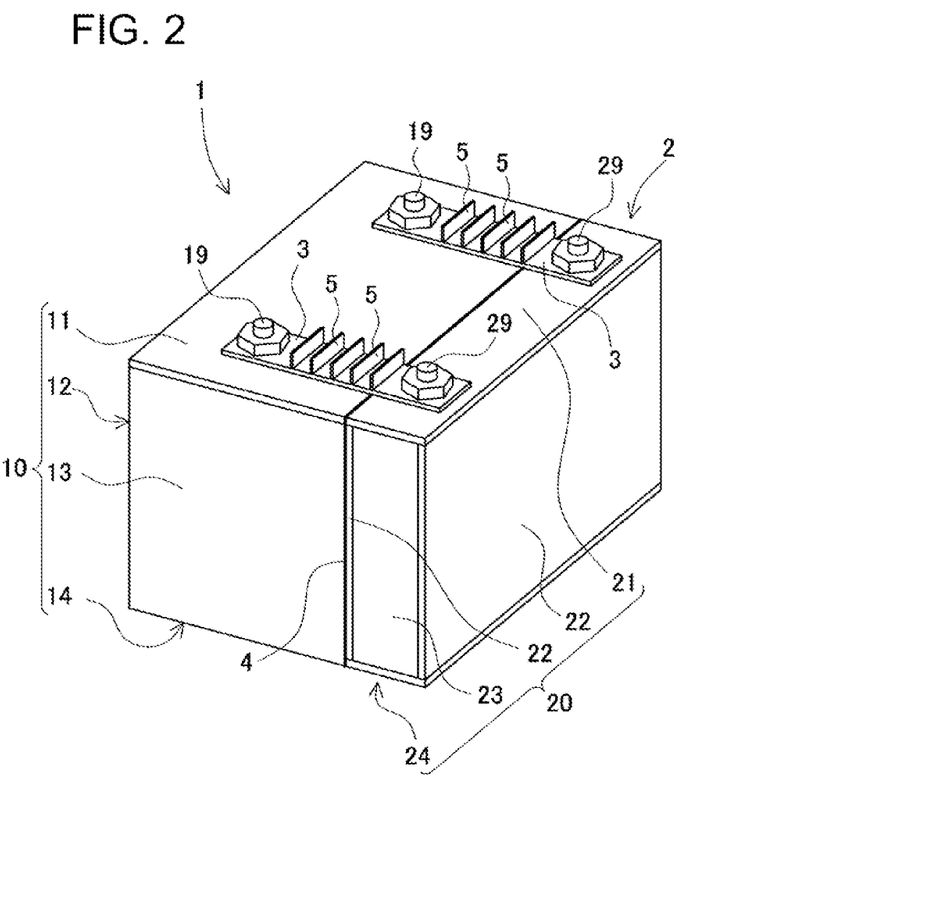
FIG. 2 is a schematic perspective view showing the power supply device related to one embodiment of the present invention.
Figure 3:
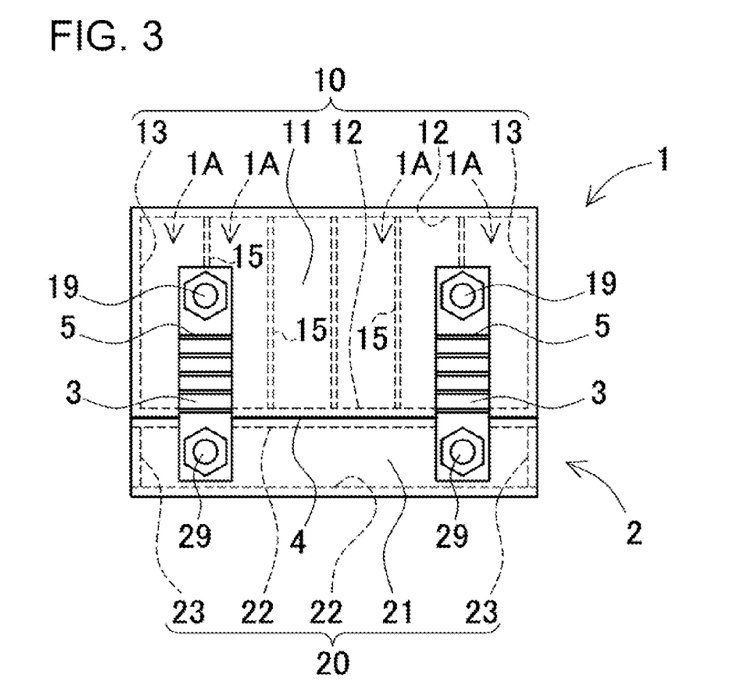
FIG. 3 is a plan view of the power supply device of FIG. 2.

A perspective view of FIG. 2 and a plan view of FIG. 3 show the lead-acid battery 1 and the power storage device 2 which are connected in parallel to each other. In the power supply device of these figures, the lead-acid battery 1 and the power storage device 2 are connected in parallel through connecting plates 3. In the power supply device having the power storage device of the condenser, not shown in figures, the bidirectional DC/DC converter is connected at the middle of the connecting plate which connects the positive sides of the lead-acid battery and the power storage device.

In the lead-acid battery of FIG. 3, in each of cells 1A divided in a battery case 10, not shown in figures, the positive and negative electrode plates are stacked in an insulating state by separators and disposed, and the electrolyte is injected at a predetermined liquid surface level. The battery case 10 has a pair of facing walls 12 and a pair of end surface walls 13 at the circumference of a rectangular bottom surface plate 14, and an upper surface plate 11 closes an upper surface thereof, and has a rectangular parallelepiped shape. As the cell voltage of the lead-acid battery 1 is 2V/cell, in the lead-acid battery 1 having a nominal voltage 12V, the battery case 10 is divided in 6 cells, and the electrode plates disposed in the cells 1A are connected in series. Dividing walls 15 divide the battery case 10 into 6 cells, and are disposed in a parallel posture to the end surface walls 13, and both end edges thereof are coupled to the inner surfaces of the facing walls 12. The battery case 10 is made of an insulating plastic of ABS resin, and molded and made in a shape where the upper surface is opened and the plurality of the cells 1A are divided by the dividing walls 13. The upper opened portion of the battery case 10 is watertightly closed by the upper surface plate 11. In this lead-acid battery 1, the positive and negative electrode terminals 19 are disposed and fixed at the upper surface plate 11.

Figure 4:
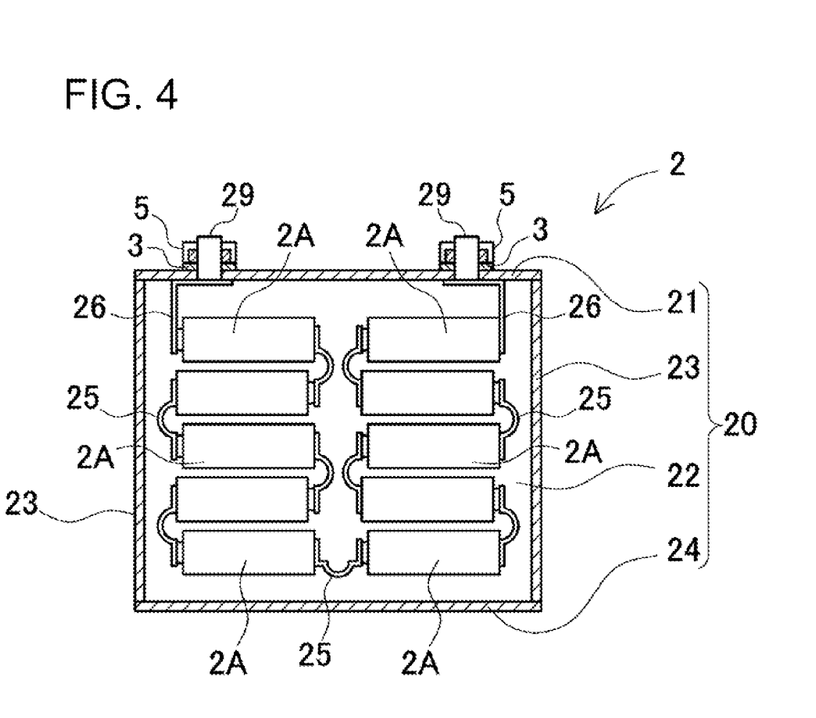
FIG. 4 is a vertical longitudinal sectional view of a power storage device of the power supply device of FIG. 2.

As shown in FIG. 3 and FIG. 4, in the power storage device 2, the secondary batteries 2A or the condensers are stored in an external case 20. The external case 20 has a rectangular parallelepiped shape, and a pair of heat radiation plates 22 which are disposed so as to face each other in the vertical surfaces. The secondary batteries 2A or the condensers are disposed between the pair of the heat radiation plates 22. In the external case 20, end portion plates 23 are coupled to both ends of the heat radiation plates 22, and then the rectangular parallelepiped shape is made. An upper surface plate 21 having output terminals 29 closes an upper opened portion, and a bottom surface plate 24 closes a lower opened portion.

One of the radiation plates 22 in the external case 20 is disposed in a thermally connected state to the facing wall 12 of the battery case 10, and heat generation of the power storage device 22 is radiated to the lead-acid battery 1. Further, the plurality of the cells 1A of the lead-acid battery 1 are disposed in a thermally connected state to the facing wall 12 such that heat of the radiation plate 22 is radiated to the plurality of the cells 1A of the lead-acid battery 1. In the power storage device 2 of FIG. 2, the radiation plate 22 is disposed in a thermally connected state to the facing wall 12 of the 6 cells in the lead-acid battery 1. A thermal conductive sheet 4 or thermal conductive paste is sandwiched between the radiation plate 22 and the facing wall 12 of the lead-acid battery 1, and then they are disposed in the ideally thermally connected state. Here, in order that the facing wall and the radiation plate tightly contact, their surfaces are made in flat shapes, and then they directly, tightly contact and are disposed in the thermally connected state.

In the power storage device 2 of FIG. 4, the plurality of the secondary batteries 2A are disposed in a horizontal posture and in vertically, multiply stacked state, and each of the secondary batteries 2A is connected in series by a bus bar 25 of a metal plate. In the power storage device 2 of this figure, the nickel hydride batteries of the cylindrical batteries are used as secondary batteries 2A, and the secondary batteries 2A are disposed in vertically 5 stacked and 2 rows, and each of the secondary batteries 2A is connected in series, and then its nominal voltage coincides with the lead-acid battery 1. The 5 pieces of the vertically stacked secondary batteries 2A are connected in series, and the 2 rows of the secondary batteries 2A are also connected in series, and then 10 pieces of the secondary batteries 2A are connected in series. The electrodes of the secondary batteries 2A of the uppermost stage are connected to the output terminals 29 by lead boards 26 of metal boards. In the power storage device 2 of FIG. 4, the cylindrical batteries are disposed in the horizontal posture and in multiply stacked state. However, in place of the cylindrical batteries, the plurality of the condensers can be also disposed in the horizontal posture and in multiply stacked state.

In the power storage device 2 where the secondary batteries 2A are disposed in the multiply stacked state, a temperature of the secondary batteries 2A in the upper stages is higher than that in the lower stages. It is a reason why the air heated by the secondary batteries 2A rises in the external case 20. The heat energy of the secondary batteries 2A in the upper stages transmits to the output terminals 29 through the lead boards 26. The heat energy transmitted to the output terminals 29, is radiated by the connecting plates 3 which connect the output terminals 29 to the electrode terminals 19, and is transmitted to the electrode terminals 19 and is radiated.

The connecting plates 3 connect the output terminals 29 of the power storage device 2 to the electrode terminals 19 of the lead-acid battery 1, and then the lead-acid battery 1 and the power storage device 2 are connected in parallel. In the power supply device of FIG. 2 and FIG. 3, as the electrode terminals 19 are provided at the upper surface of the lead-acid battery 1, and the output terminals 29 are provided at the upper surface of the power storage device 2, the connecting plates 3 are disposed at the upper surfaces of the battery case 10 and the external case 20. Each of the connecting plates 3 has predetermined width and thickness, and is a metal board having heat radiation fin 5 at the upper surface thereof. The connecting plates 3 radiate the heat transmitted from the output terminal 29 of the power storage device 2. The connecting plate 3 of FIG. 2 and FIG. 3 has a larger area facing to the battery case 10 of the lead-acid battery 1 than an area facing to the external case 20 of the power storage device 2, and then the heat is more efficiently radiated. As the connecting plates 3 can more efficiently radiate the heat at the lower ambient temperature, the area facing to the battery case 10 at the lower temperature of the lead-acid battery 1 is made larger than the area facing to the external case 20 at the higher temperature of the power storage device 2, and then the heat is more efficiently radiated.

In the above power supply device, at the regenerative braking, generated power by the alternator 33 is stored in the lead-acid battery 1 and the power storage device 2. The stored power is used at restarting of the engine 31, and is supplied to operate the electrical equipment 30. The power storage device 2 and the lead-acid battery 1 generate heat, but the power storage device 2 having the larger storage capacity makes the larger heat generation amount than that of the lead-acid battery 1. Therefore, in the state of driving the vehicle, namely in the ON state of the ignition switch as the main switch, the temperature of the power storage device 2 becomes higher than that of the lead-acid battery 1. The heat generation energy of the power storage device 2 at the increased temperature is transmitted from the heat radiation plates 22 of the external case 20 to the facing wall 12 in the thermally connected state of the lead-acid battery 1. Further, the heat generation energy of the power storage device 2 is transmitted to the connecting plates 3 through the output terminals 29, and then the heat is also radiated from the connecting plates 3. In addition, as the connecting plates 3 are connected to the electrode terminals 19, the heat is transmitted from the connecting plates 3 to the electrode terminals 19, and the heat also radiated also from the lead-acid battery 1.

INDUSTRIAL APPLICABILITY

The power supply device of the present invention is installed in the vehicle having the regenerative braking function, and improves a fuel efficiency, and prevents the abnormal temperature increase of the power storage device which stores regenerative generation power, and then can be safely used.

The invention claimed is:

1. A power supply device for a vehicle performing regenerative braking, the power supply device comprising:
    a lead-acid battery disposing a plurality of cells in a battery case of a rectangular parallelepiped shape, the battery case having a pair of facing walls and a pair of end surface walls at the circumference of a rectangular bottom surface plate; and
    a power storage device connected in parallel to the lead-acid battery,
    wherein the power storage device has a larger capacity by regenerative braking than that of the lead-acid battery,
    wherein the power storage device has a plurality of condensers or a plurality of secondary batteries disposed in an external case, the external case being arranged adjacent to one of the facing walls of the battery case of the lead-acid battery,
    wherein the external case of the power storage device has a heat radiation plate disposed in a thermally connected state between (i) the one of the facing walls of the battery case of the lead-acid battery and (ii) the condensers or the secondary batteries of the external case of the power storage device, and
    wherein the heat radiation plate is thermally connected to the one of the facing walls of the battery case of the lead-acid battery.

2. The power supply device for a vehicle performing regenerative braking according to claim 1,
    wherein the secondary batteries are disposed in a horizontal posture and in vertically multiply stacked state in the external case, and each of the secondary batteries is connected by a bus bar of a metal plate,
    wherein the power storage device further comprises an output terminal connected to an electrode of one of the secondary batteries which is located on an upper surface located opposite a bottom surface of the external case of the power storage device, and wherein the output terminal is connected in parallel to an electrode terminal provided on an upper surface of battery case of the lead-acid battery through a connecting plate of a metal board.

3. The power supply device for a vehicle performing regenerative braking according to claim 2,
wherein the secondary batteries are nickel hydride batteries.

4. The power supply device for a vehicle performing regenerative braking according to claim 2,
wherein the secondary batteries are lithium ion secondary batteries or lithium polymer batteries.

5. The power supply device for a vehicle performing regenerative braking according to claim 2,
wherein the connecting plate has a larger area facing to the battery case of the lead-acid battery than an area facing to the external case of the power storage device.

6. The power supply device for a vehicle performing regenerative braking according to claim 1,
wherein the power storage device is a condenser.

7. The power supply device for a vehicle performing regenerative braking according to claim 1,
wherein the lead-acid battery is connected in parallel to the power storage device through a connecting plate having a heat radiation fin.

* * * * *